Aug. 9, 1960  D. B. DOOLITTLE ET AL  2,948,291
JET POWER LAUNCHING SYSTEM
Filed Dec. 19, 1955  12 Sheets-Sheet 6
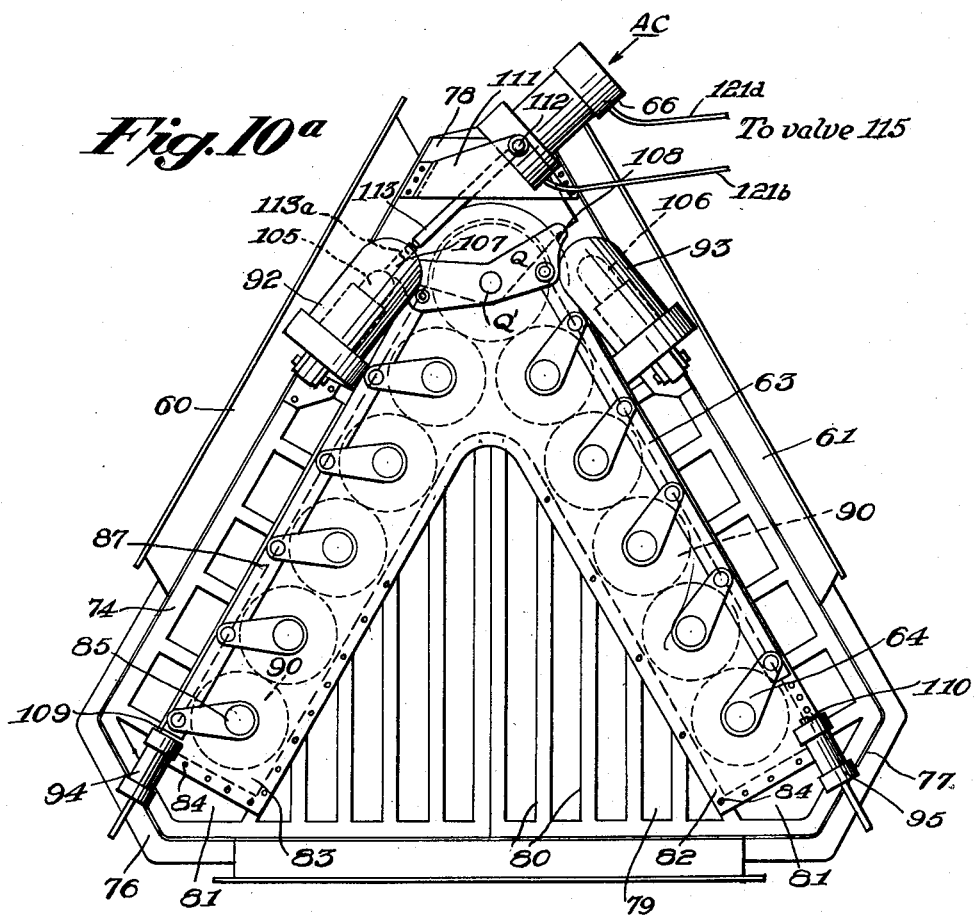
INVENTORS
Donald B. Doolittle
and Robert J. Haber
BY Herbert M. Birch
ATTORNEY

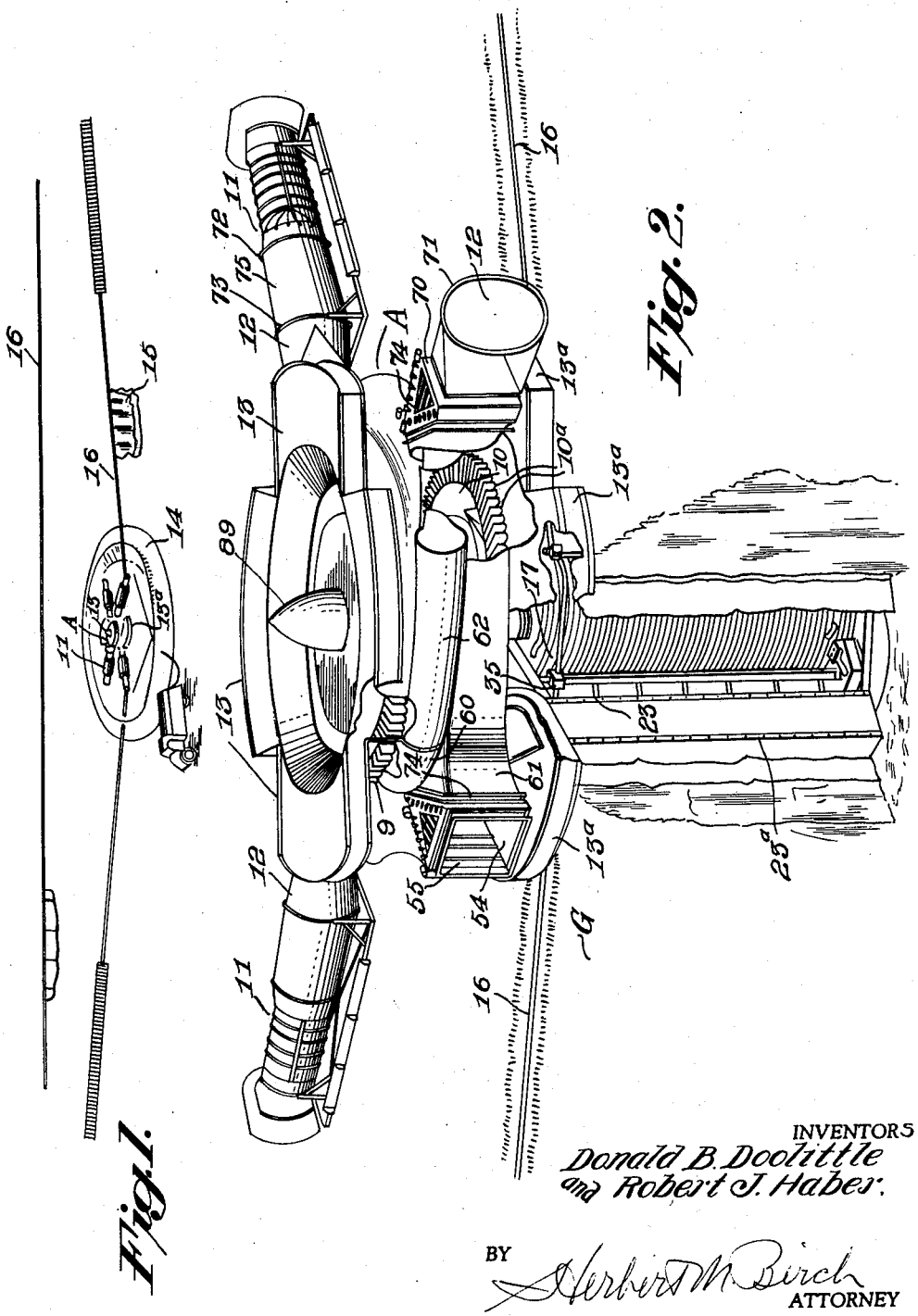
Aug. 9, 1960    D. B. DOOLITTLE ET AL    2,948,291
JET POWER LAUNCHING SYSTEM
Filed Dec. 19, 1955    12 Sheets-Sheet 1
INVENTORS
Donald B. Doolittle
and Robert J. Haber.
BY
ATTORNEY Aug. 9, 1960 D. B. DOOLITTLE ET AL 2,948,291
JET POWER LAUNCHING SYSTEM
Filed Dec. 19, 1955 12 Sheets-Sheet 4
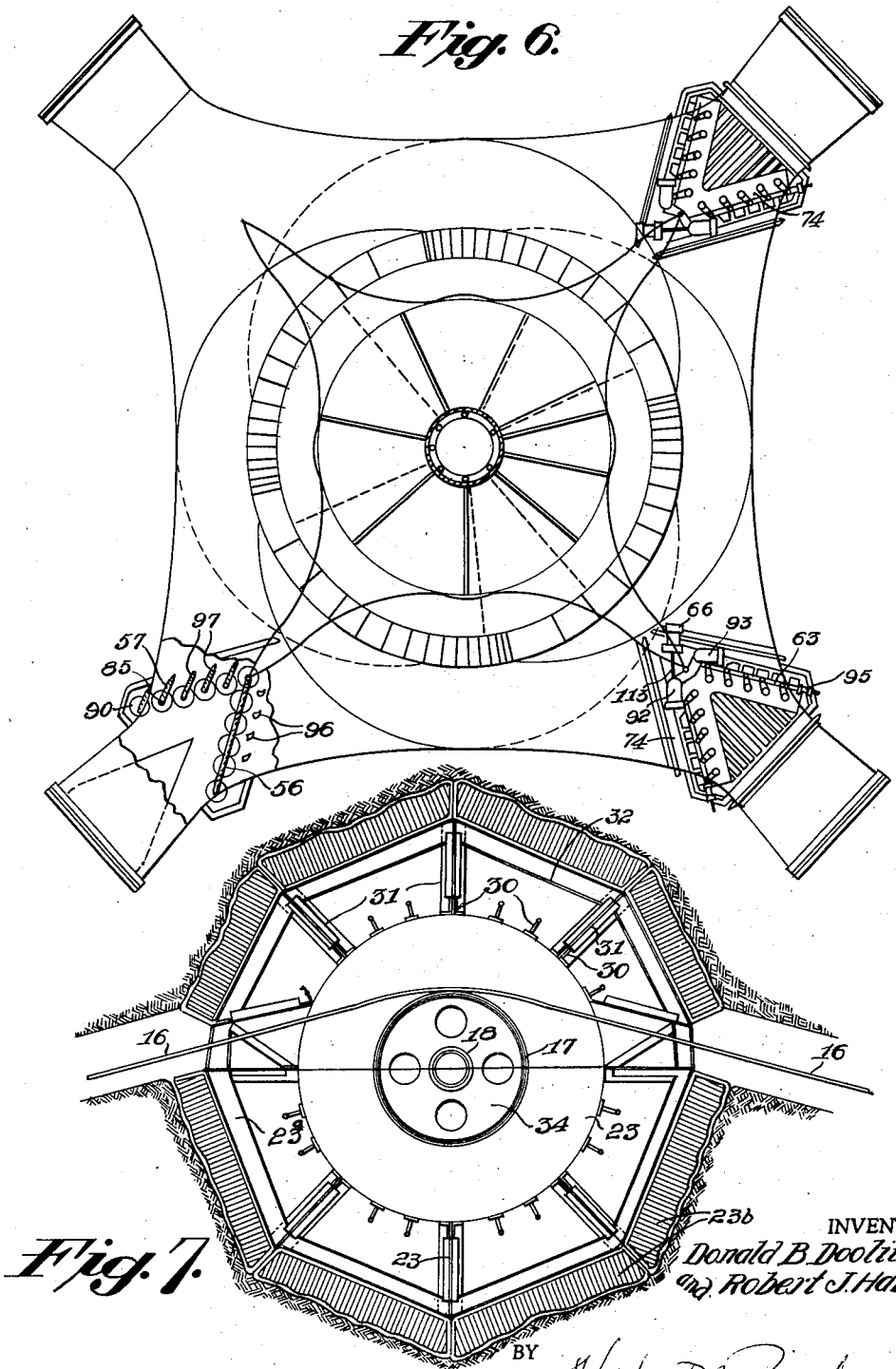

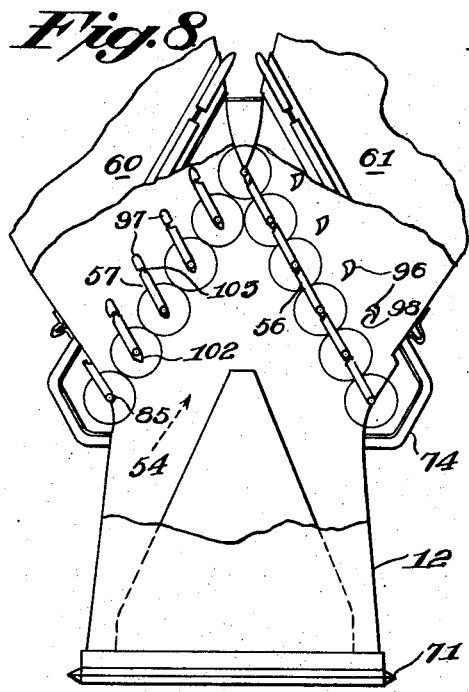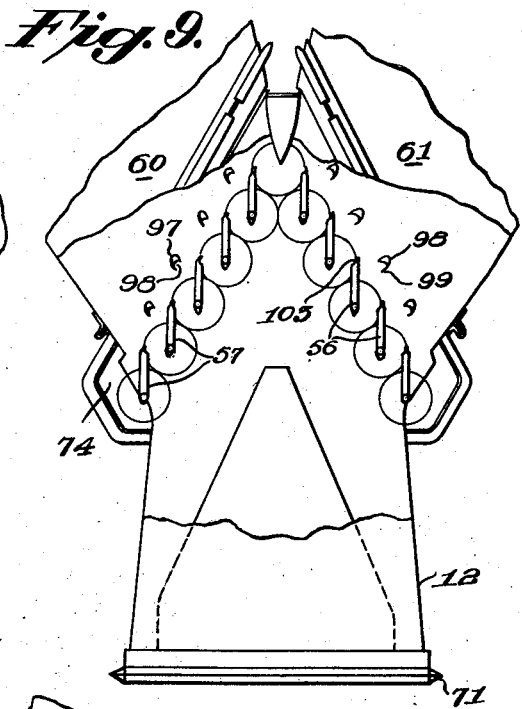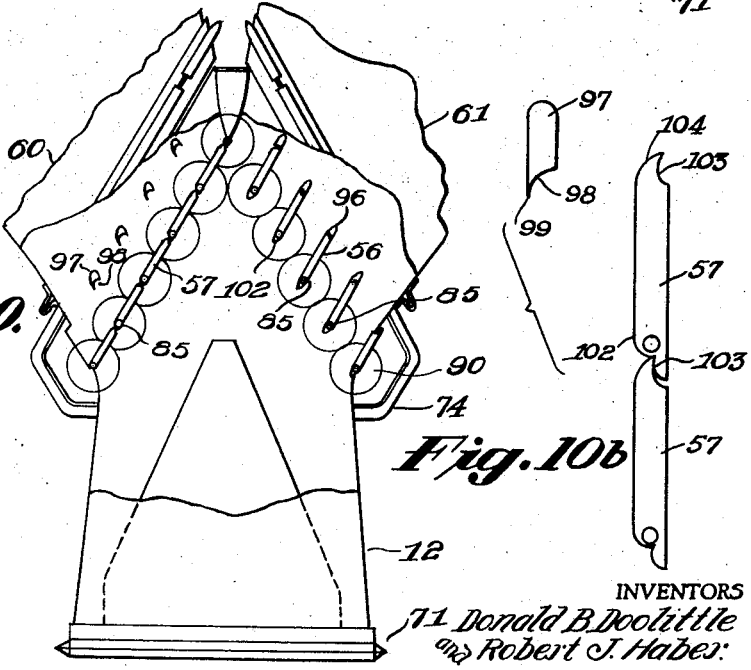

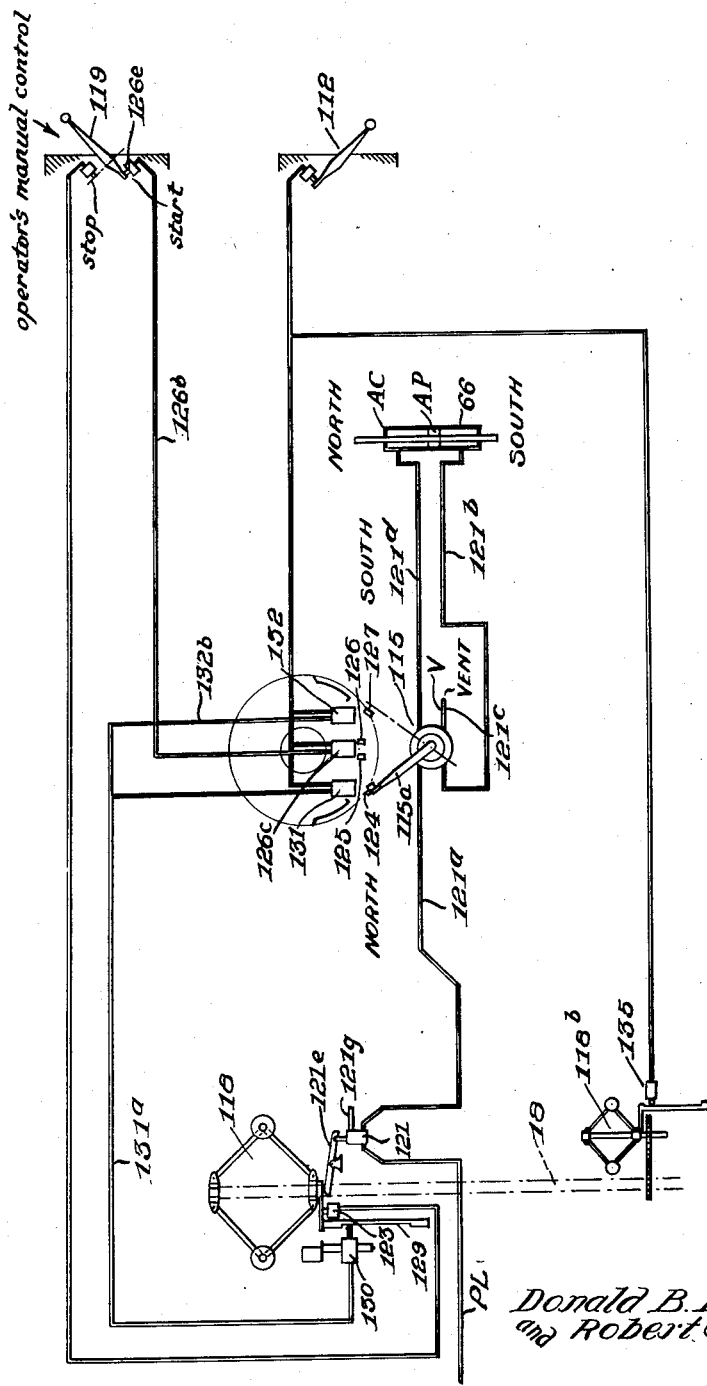

Aug. 9, 1960 D. B. DOOLITTLE ET AL 2,948,291
JET POWER LAUNCHING SYSTEM
Filed Dec. 19, 1955 12 Sheets-Sheet 8
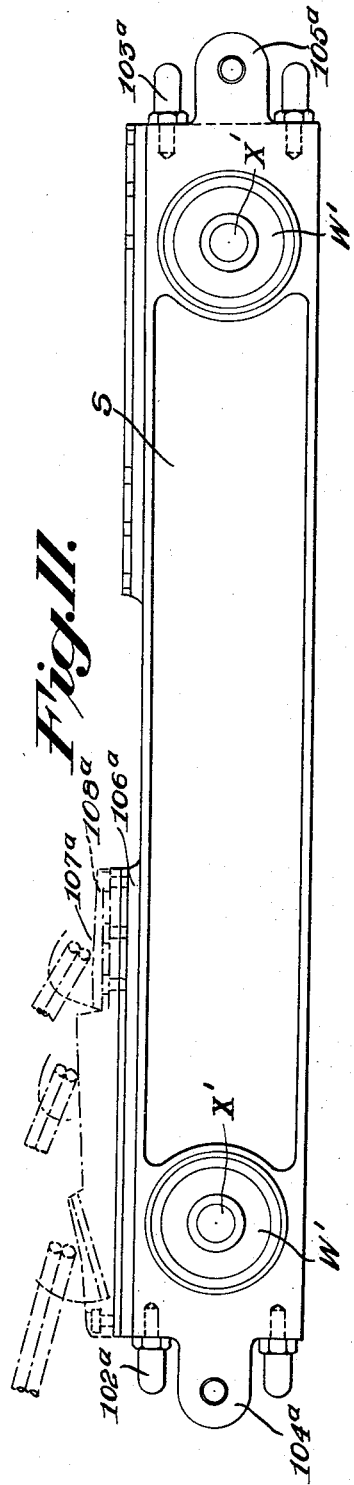
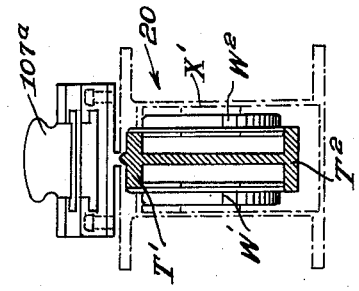
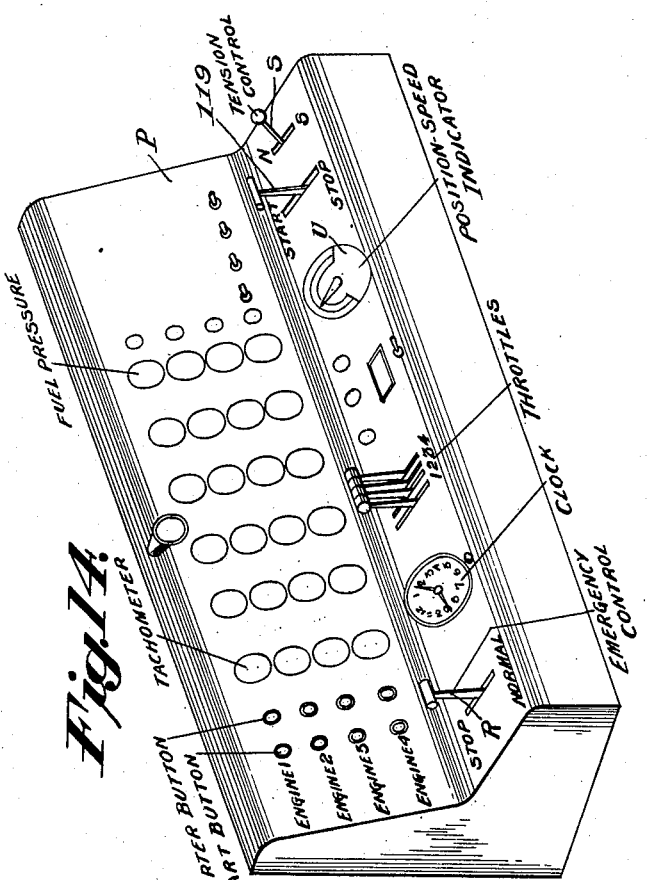
INVENTORS
Donald B. Doolittle
and Robert J. Haber
BY
Herbert M. Birch
ATTORNEY Aug. 9, 1960     D. B. DOOLITTLE ET AL     2,948,291
JET POWER LAUNCHING SYSTEM
Filed Dec. 19, 1955     12 Sheets-Sheet 9

INVENTORS
Donald B. Doolittle
and Robert J. Haber:

BY Herbert M. Buck
ATTORNEY

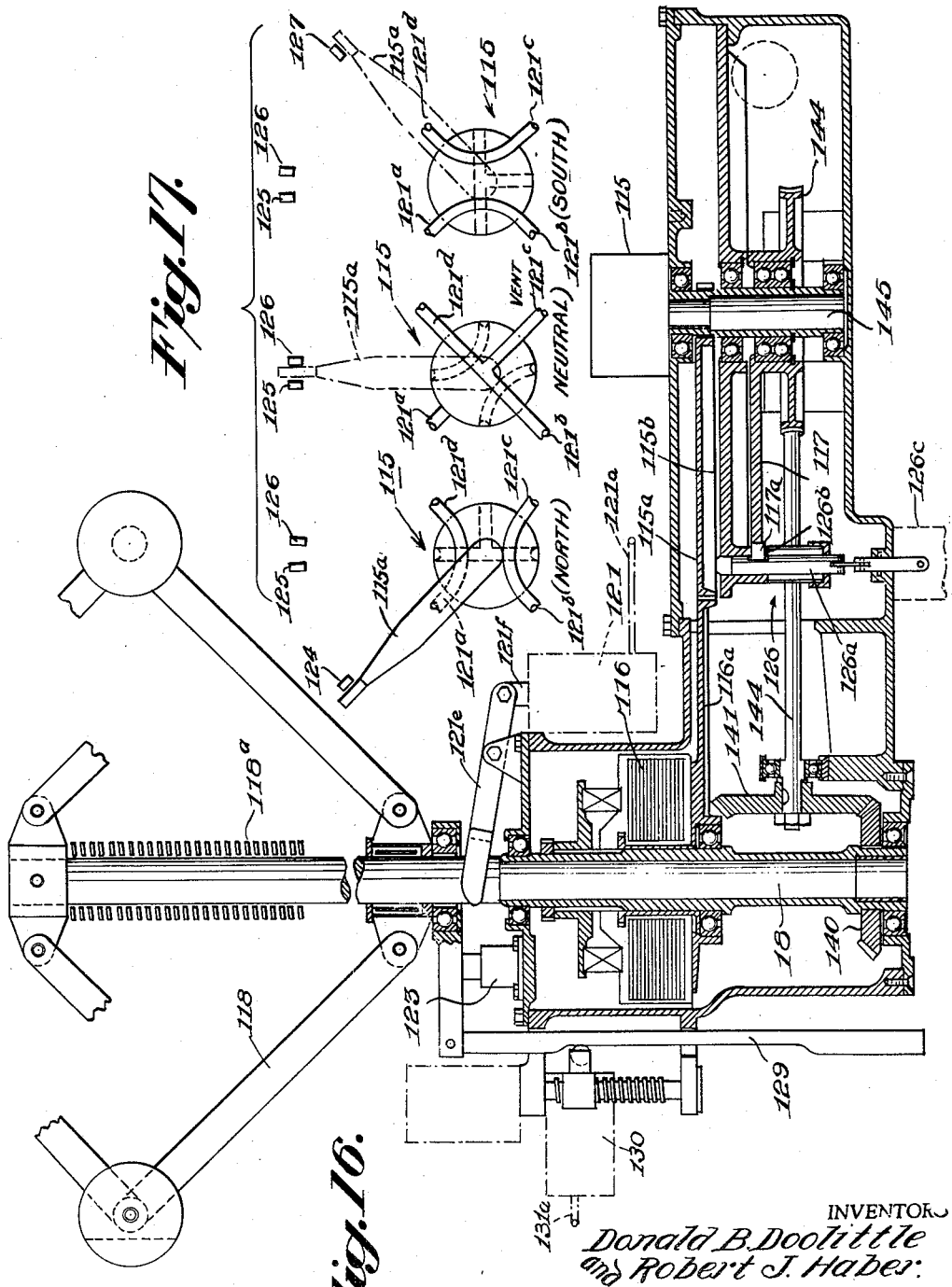

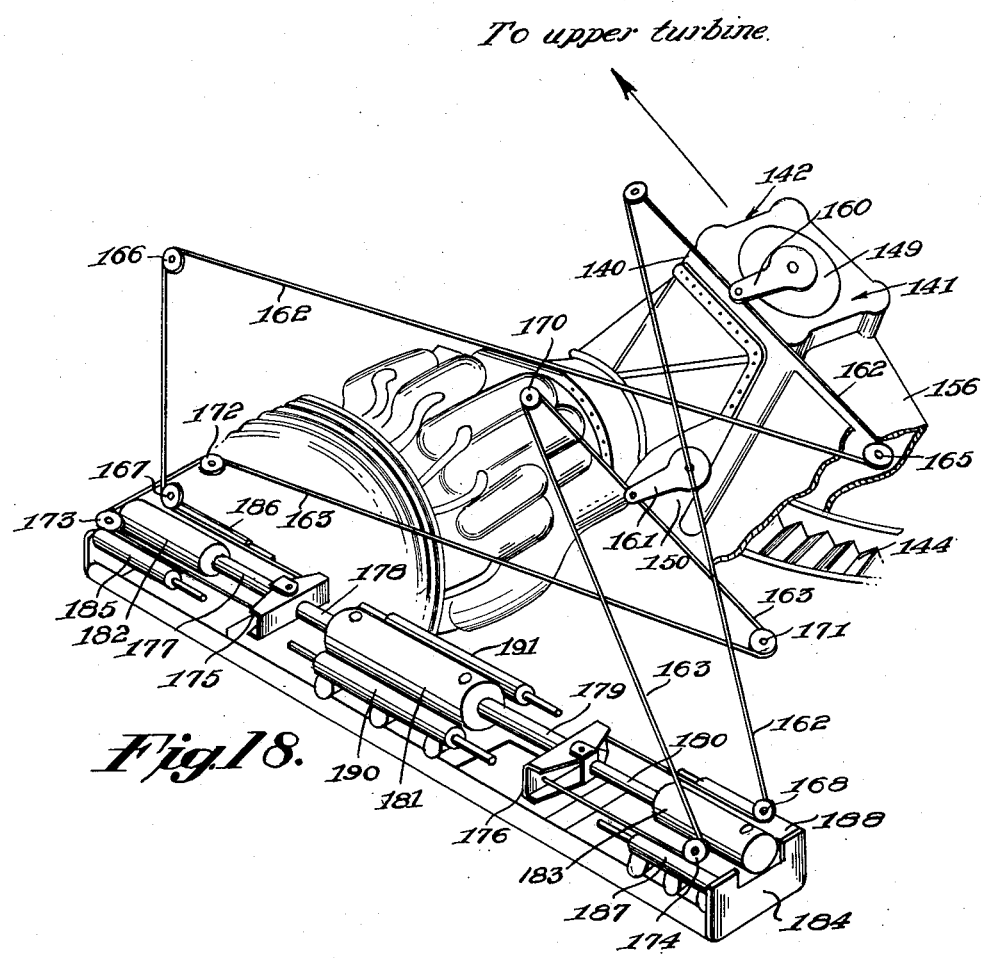

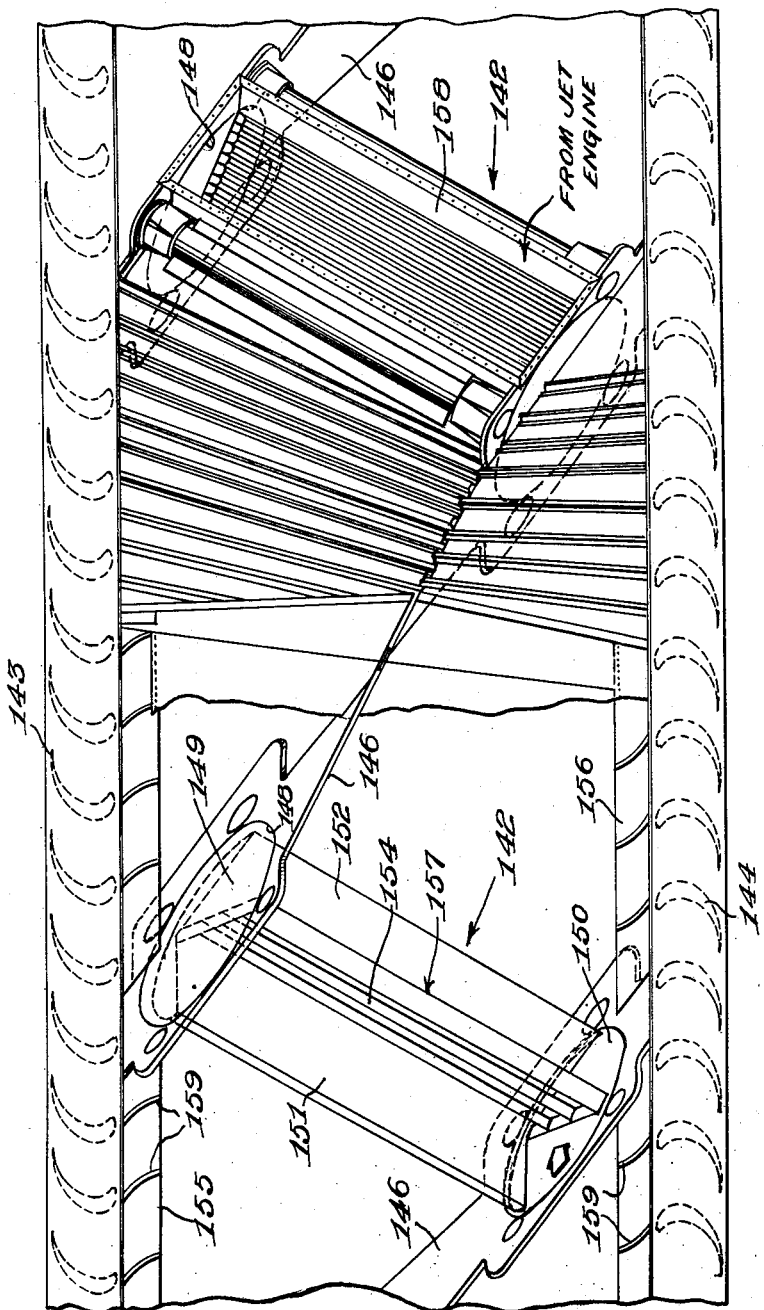

United States Patent Office
2,948,291
Patented Aug. 9, 1960

2,948,291

JET POWER LAUNCHING SYSTEM

Donald B. Doolittle, Wilmington, and Robert J. Haber, New Castle, Del., assignors to All American Engineering Company, Wilmington, Del., a corporation of Delaware Filed Dec. 19, 1955, Ser. No. 553,903

22 Claims. (Cl. 137—22)

The present invention relates to a jet power launching system and more particularly to a jet powered turbine with reversible rotor means in combination with an aircraft catapult launching mechanism.

Heretofore, with turbine power systems, it has been necessary to provide brake means, such as friction brakes or gearing connections for stopping the turbine. These various brake systems are subject to wear and possible failure in use.

An object of this invention is to eliminate the need of any friction brake or gearing to stop the machine and also to provide for efficient reciprocal launching by reversing the turbine rotation following a braking action on the turbine by a reverse jet flow control.

Another object is to provide combustion gas means for driving opposed superimposed turbine means by manipulation of a novel jet exhaust flow control means, whereby selective operation of said turbine means in opposite directions is permitted, to thereby impart driving power to the turbine means and any operatively connected mechanism, such as a catapult launching mechanism and to transfer the jet exhaust from a first direction to a reverse direction, to thereby provide a positive braking torque to stop the turbine means.

Another object is to provide manually settable speed controlled operating means for regulating said flow control means, which operating means is settable to be responsive to the required launching speed of the catapult mechanism.

A further object is to provide novel means responsive to operative controlling conditions adapted to sense and control the operational performance of the combustion gas means.

The above and other objects and advantages of the invention will appear more fully hereinafter from a consideration of the detailed description which follows, taken together with the accompanying drawings wherein two proposed embodiments of the invention are illustrated. It is to be expressly understood, however, that the drawings are for the purpose of illlustration only and are not intended to define the scope of the invention, reference being had for the purpose to the appended claims.

In the drawings wherein like reference characters refer to like parts throughout the several views:

Figure 1 is a partial schematic aerial view of the assembled mechanism with the ends cut off to conserve space;

Figure 2 is an enlargement of the turbine and power means shown in the center of Figure 1 with two of the said means removed from the control gate means;

Figure 6 is a view similar to Figure 5 with the vanes set for a north launching;

Figure 7 is a transverse section view taken along section line 7—7 of Figure 4;

Figure 8 is a detailed view of the flow control gate with the vanes on one side closed for a north launching;

Figure 9 is a detail in elevation of the flow gate with the vanes in neutral position;

Figure 10 is a view in detail of the flow gate with the vanes set for a south launching;

Figure 10a is a top plan view of a control gate disclosing the actuating cylinder, the buffer cylinders and the tension cylinders and their respective connections to the central linkage for the flow gate vanes shown in Figures 8–10;

Figure 10b is a partial side elevation view of the flow gate vanes generally shown in Figure 10;

Figure 11 is a side elevational view of a shuttle used with this invention;

Figure 12 is a transverse section view taken through the shuttle and the track along which the shuttle is adapted to roll in either direction;

Figure 13 is a diagrammatic illustration of the fluid control circuit and turbine control mechanism for the present invention;

Figure 14 is a general view of a control panel with the various control levers and gages used in the operation of the mechanism;

Figure 16 is a longitudinal section view taken centrally through Figure 15;

Figure 17 is a schematic illustration of the main manual control valve for operating the control system for north launching, neutral and south launching positions;

Figure 18 is a perspective view of a second form of control gate showing it connected with a combustion gas means and cut away to show the lower turbine; and Figure 19 is a side elevational view of the gate mountings and their respective positions adjacent the upper and lower turbines.

Figure 3:
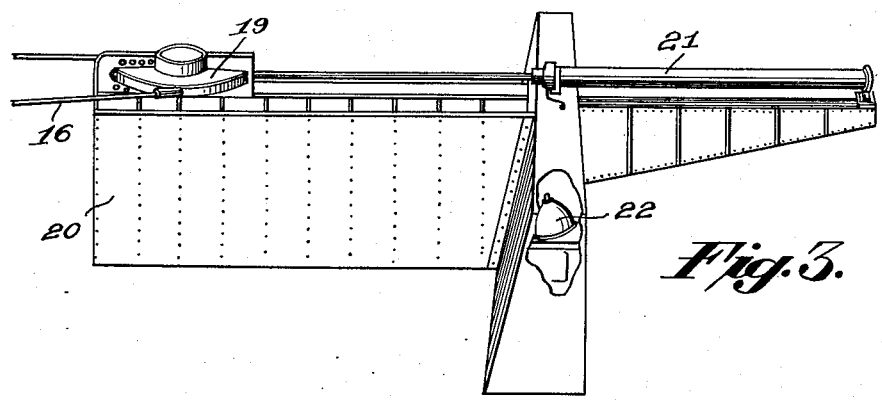
Figure 3 is a perspective view of one of the end connections and shuttle buffer stations left off at each end of Figure 1.

Referring to the drawings and first taking an aerial view of the assembly as illustrated in Figures 1 and 2, there is a double turbine A with superimposed turbine wheels 9 and 10, a group of radially positioned jet power means such as 11 are each connected to a respective one of the inlet diffuser ducts 12 leading to the rotating turbine assembly and upper and lower outlet ducting assemblies 13 and 13a, a surrounding sand bag revetment 14, a cable trench 15 and a launching cable 16 leading off from the cable drum 17 on a hollow shaft 18 (see Figs. 2 and 4 for details), and reeving sheaves such as 19 at each end of the catapult track 20 with a hydraulic tensioning cylinder 21 and a fluid line connection to an accumulator 22 (see Fig. 3 for details). Off to the side of the track 20 may be an operator's shack, which houses a control panel P (see Fig. 14).

GENERAL SUPPORTING STRUCTURE

Figure 4:
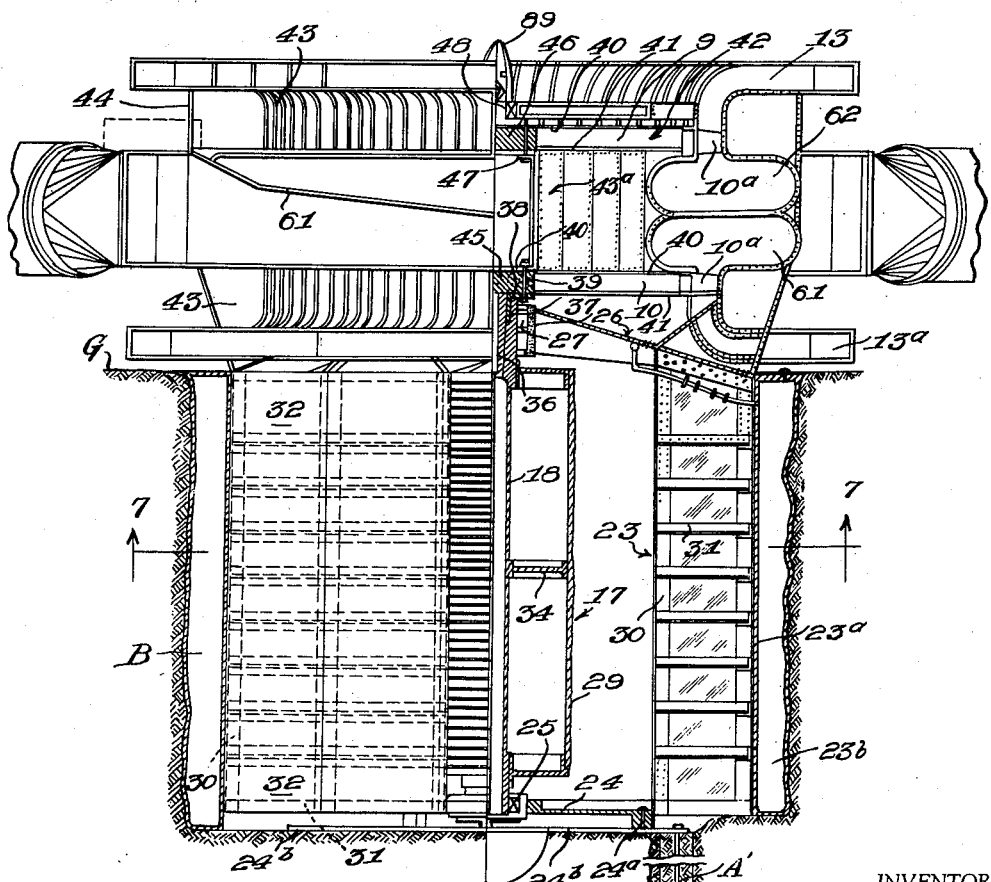
Figure 4 is a view partially in elevation and a partly longitudinal section of the turbine, cable and mounting structure therefor.
Figure 5:
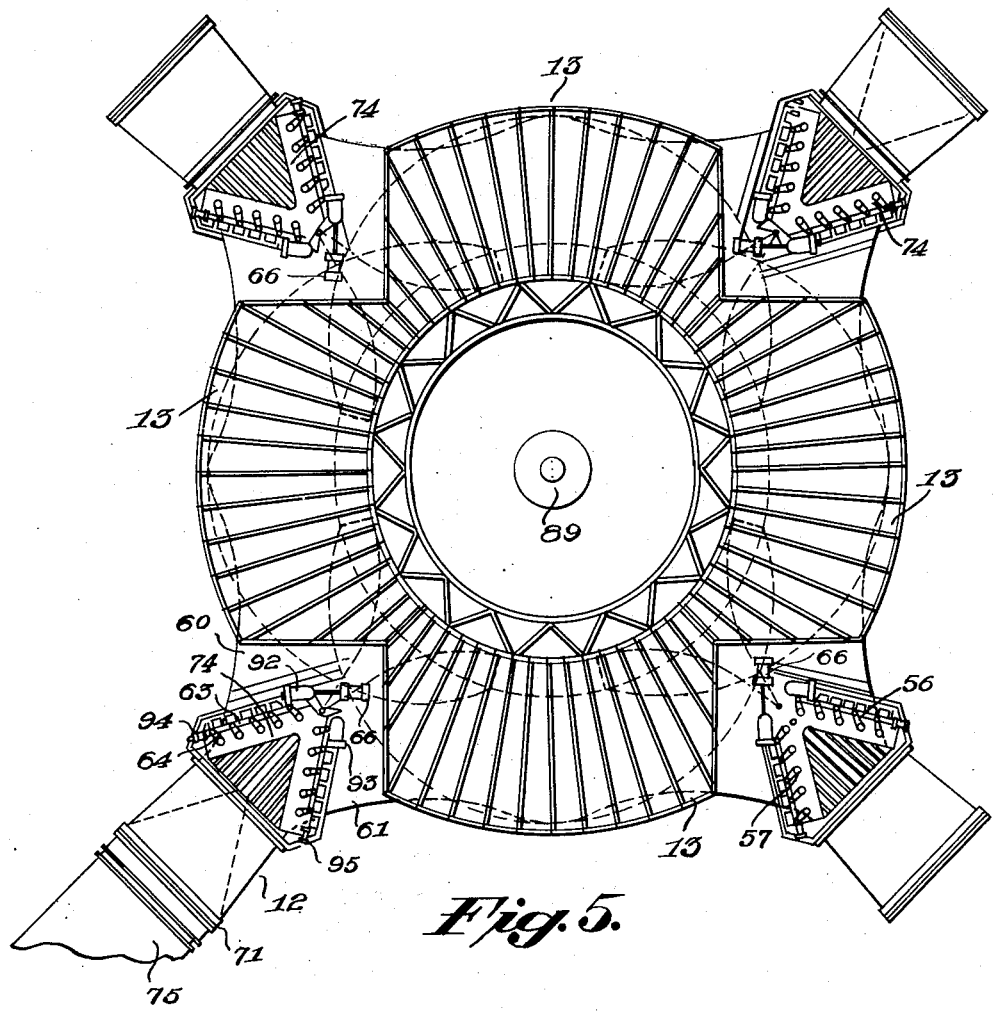
Figure 5 is a top plan view showing the connections of each of the jet exhaust gas flow control gates with their respective combustion gas means and the gas directing to the superimposed oppositely directed turbine vanes of the double turbine rotor.

The supporting structure for the rotating turbine assembly, the rotating cable drum assembly and ducting, gas flow control gate assemblies, hub mounted speed and position sensing mechanism and exhaust diffuser ducting are illustrated in Figures 2 and 4. This turbine assembly with the necessary ducting is mounted horizontally with the lower exhaust ducts 13a close to the ground level G, while the cable and drum assembly with the entire support structure surrounding the drum are located in a pit B dug in the ground.

The structure supporting the turbine and drum assemblies consists of an inner shell 23, such as a slotted shell having lower and upper castings 24 and 26, which serve as end bulkheads and bearing supports for lower and upper bearings 25 and 27, respectively. The lower or bottom casting 24 also functions as a machine base and is secured by bolts 24a to an adjustably levelled steel mounting plate 24b. This mounting plate 24b is held in the pit B by three conventional earth anchors, such as A', see Fig. 4. This shell is held tight and with minimum of vibration by suitable means such as a liquid filled cell 23b or it may be earth packed.

Two groups of vertical and horizontal beams 30 and 31, the horizontal group radially extending from the inner shell 23 to the outer shell 23a and the vertical beams having one of each of their respective ends supported by the respective top and bottom castings or bulkheads 24 and 26, are provided. These beams act as supports for a series of flat panels 32 which are connected together along an outer circumference by fasteners, such as bolts or rivets as is indicated in Fig. 4. As shown the upper portion of the inner shell 23 is slotted on opposite sides for the cable 16 to pass through, Figure 7.

The double turbine assembly is fixed to the vertically mounted shaft 18. This shaft consists of an elongated hollow cylinder journalled for rotation in the casting 24 acting as the lower end bulkhead and support for bearing 25 at the base extremity and in a second casting 26 and support for the upper bearing 27. Secured to the outer periphery of the shaft 18 is the cable drum 17 by annular truss means or disk 34 and secured to the peripheral annular exteriors of the castings 24 and 26 is a spirally grooved plate 29, hereinafter referred to as the catapult cable drive drum 17, see Figures 2 and 4. The disk 34 is placed at the center of the grooved drum plate 29 to keep the center of the shaft 18 from deflecting, which in turn reduces the tendency for the shaft to whip. The feed of the catapult cable 16 is controlled from the cable drum 17 by a level wind arrangement 35, such as is known in the art, see Figure 2.

The upper end of hollow shaft 18 is keyed to a collar 36 by a key 37. This collar is also fitted into the upper bore of the hollow shaft 18 and the collar comprises a flange 38 secured by means, such as bolts 39, to the hub of the lower plate 40 of the lower turbine member 10, see Figure 4.

THE TURBINE STRUCTURAL ASSEMBLY

The turbine rotors 9 and 10 are made so as to keep the weight thereof to a minimum and yet have them as rigid and strong as possible. Each rotor is a substantial duplicate of the other, but the vanes are opposed so that the rotors tend to rotate in opposite directions. Each rotor is comprised of two spaced apart thin disks 40 and 41 with radial webbing or struts 42 between the disks, see Fig. 4. There may be any number of such webbings between the spaced sides of which are mounted the turbine blades 10a. Also, several equally spaced reinforcing radial webs or struts 43 may be formed between the upper and lower rotor exhaust or outlet ducts 13 and 13a and a thin sheet metal shell 44 will be placed around the other ends of the intermediate radial webs or struts 43. The rotors are connected together by plates 43a, which greatly reduces any possibility of relative vertical movement between the same as well as rigidity of the assembled double turbine structure. Also, this construction reduces the tendency for vibration.

Thus as indicated in Fig. 4 the turbine rotors are connected together by plates 43a as an assembled unit with the hubs 45 and 46 of each rotor also connected for unitary rotation. For example, the hub 45 of the lower rotor is secured to the flange 38 of collar 36 which is keyed to cable drum shaft bearing 27 and hub 46 of the upper rotor is secured by bolts 47 to a part of a rotatable bearing race 48 adjacent the lower portion of a centrally positioned flow gate control unit; to be hereinafter described.

The turbine is powered by any suitable stock aircraft jet engine, such as shown at 11. The pressure developed at the turbine exit or exhaust of the respective jet engines will determine the most suitable catapult turbine blade design and the engine exhaust diffuser ducts are connected to the inlet diffuser ducts 12 which direct the exhaust gas into a flow control chamber 54, which mounts a remotely settable and pressure controlled flow gate means 55. This includes movable right and left gate vanes 56 and 57 and fixed vanes 96 and 97, respectively, see Figures 8, 9, 10 and 10a. These gate vanes direct the gas exhaust flow through the left or right branches 60 and 61 of the turbine power inlet ducting 62 for north and south launching. These gas control vanes are operated by lever means 63 and bell-crank arms 64. The lever 63 is connected to a piston rod 113 of power cylinder 66, which is powered by fluid pressure controlled and in response to a turbine speed sensing and reversing mechanism housed in the turbine hub 89, see Figure 4.

The jet engine mass flow of exhaust leads into the inlet diffuser ducts 12 which each have connecting flanges 70 and 71 on each end to one end of which the engine tail pipe mounting flange member 72 of each engine 11 is secured, while the opposite mounting flange 73 is secured to the mounting flange 71 of the novel flow control gate housing 74. The flange 71 defines a circular path for cooperation with the standard shape of a jet engine tail pipe 75, but the opposite duct mounting flange 70 is shaped to define a rectangular formation to fit the rectangular opening leading into the control gate housing 74.

The gate housing 74 is of prismatic shape and is formed from a frame work comprising three corner bulkheads or supports 76, 77, 78, and having top and bottom triangular sheets 79 having reinforcing ribs 80 formed with a V-shaped opening or slot 81 having a sealing face 82 around the edges, see Fig. 10a.

These V-shaped slots receive the mounting blocks, such as V-shaped plates 83 for the movable right and left vanes 56 and 57 of the control gate. These V-shaped plates are secured by fasteners 84 to the sealing face 82 with a sealing gasket thereon, not shown, and also serve as bearing supports for the ends of flow control vane shafts 85 connected by the crank arms 64 to the actuating lever 63 and power cylinder 66 under control of the speed sensing means housed in the turbine hub 89, see Figure 4. These movable vanes 56 control the left branch 60 and movable vanes 57 control right branch 61 of the turbine power inlet ducting 12. Each vane may be forged integral with disk seals 90 and the shafts 85 on each end.

Each set of movable vanes of the respective valve sections is moved under control of five air rams or pistons and cylinders, namely, buffer rams 92 and 93, the main actuating ram 66 and the tensioning cylinders or rams 94 and 95. Also, cooperating with each set of movable vanes is a set of fixed vanes 96 and 97, respectively, see Figures 8, 9 and 10. The fixed vanes are mounted in the respective outlet diffuser openings in front of the movable vanes with their respective streamlined edges in the direction of flow. These fixed vanes 96 and 97 each have one end thereof provided with a concave surface 98 with a resulting flange 99. The respective movable vanes 56 and 57 are of elongated form and include nose portions 102, which interfit with the concave surfaces 103 in the opposed ends of the vanes and which ends have convex surfaces 104, which are engageable with the concave surfaces 98 of the fixed vanes 96 and 97. Thus when the movable vanes 56 and 57 are closed across the inlet duct opening the respective nose portions 102 engage with the concave surfaces 103. This makes the equivalent of a one-way tongue and groove interlock and provides an effective valve sealing closure. When the vanes are swung open on their respective mountings, the surfaces 104 thereof seat flush against the cooperating surfaces 98 and thereby provides a smooth unimpeded flow of gas from the jet engine to the turbine mechanism.

FLOW CONTROL GATE

Control of the flow to the turbine

The jet engine mass flow is ducted to either or both of the opposed turbine rows 9 and 10. The distribution of mass flow between these rows (and hence the torque exerted by the turbine) is controlled by the foregoing described flow control gates downstream of any of the several jet engine diffusing ducts 12.

With the turbine in launching operation, the shutters or vanes 56 or 57 are fully closed on one side and open on the other side, see Fig. 8. There is a pressure difference across the closed shutters because of the higher pressure on the gas side; this creates a torque on each vane due to eccentric pivot point location of each shaft 85. The center shutters or vanes may be larger than each end shutter and are pivoted about their quarter-chord so that they have negligible pitching moment. Thus it is obvious that the closed side has a tendency to open. The two sides are linked together so that this opening tendency will supply a high initial torque in actuating the system. As the shutters or vanes 56 or 57 are cracked open, the expanding flow over the backside establishes a pressure gradient which decreases from the leading edge to the trailing edge of the shutters or vanes. This pressure gradient tends to increase the initial opening torque as the shutters are opened the first few degrees.

Each one of the flow control gates is complete in itself, and it may be completely preassembled as a unit and then bolted to the turbine rotor power flow ducts 12 and to a respective jet engine tail duct 75, see Figures 2 and 10a.

The stationary trailing edges 98 of the flow gate fixed vanes 96 and 97 and the leading and trailing edges of the movable vanes 56 and 57 are cut so that a joint is formed both in the open and closed position. This decreases the pressure loss across the flow gates in the closed position and the pressure loss due to the drag of the open vanes is only, for example, 0.238%.

Actuation of the flow control gate

For most effective actuation the system must be capable of: complete reversal of the flow gate vanes in as short a time as possible; supplying a buffing action to eliminate slamming the movable vanes 56 and 57 against the fixed vanes 96 and 97; holding the vanes in the neutral position; manual control; and a means of tensioning the cable with the turbine. From the aerodynamic characteristics of the vanes or vane units when acted upon by the gas load, it is obvious that the main purpose of the actuating cylinder 66 is to hold the valve vanes in the closed position. It must exert a force, for example, of approximately 3,000 lbs. to do this. Since it must act so quickly, the actuating cylinder 66 is preferably pneumatic. In order that it does not offer a buffer resistance to the gate motion, that is vane movement, its actuating force must be applied throughout the entire stroke. The energy input from the vanes in the first half of the stroke is slightly less than that absorbed by them in the second 30° of travel so that it is not necessary to provide a buffer-resistance for the vanes, such as the buffers 92 and 93.

The type of buffer finally chosen is shown generally in Fig. 10a, and there are three pressures to be considered when calculating the energy that may be absorbed by this hydraulic-pneumatic combination. The static-unloaded pressure is the small precharge in the actuating cylinder 66 also labelled AC, shown in Fig. 13 and is present only when a respective buffer piston rod 105 or 106 is fully extended. The static-loaded pressure is the result of retraction of the buffer rod; its maximum value occurs when the piston of the buffer hydraulic cylinder is fully retracted. The buffer elements 92 and 93 are interconnected through a common fluid accumulator, not shown, as is well known in the art for interconnecting push-pull type shock absorbing or acceleration damping elements. This static-loaded pressure is the precharge pressure plus an increase due to the air volume decrease in the accumulator. The third pressure, dynamic, is the result of the tapered orifice inside the buffer through which the fluid must flow before passing to the accumulator. This dynamic pressure is constant under design conditions. Thus the pressure developed in the buffer under design conditions is a constant pressure (the sum of the precharge and the dynamic) plus the air pressure increase in the accumulator. Only the actuating cylinder energy (plus a margin of safety) need be absorbed, and this in turn is equal to the maximum gas load on the gates plus the maximum static-loaded pressure in the accumulator.

When the gates are in the neutral position, each of the buffer rods 105 and 106 are in contact with their respective arms 107 and 108 which are formed as integral extensions of a rocker plate Q symmetrically pivoted at Q'; so that one or the other will be moved regardless of the direction in which the gate vanes move in Figure 10a. The instant that the actuating cylinder 66 moves from the neutral point, contact with one buffer rod is broken; the other buffer offers resistance for the entire half-stroke. When the end position is reached (one side completely closed), see Figure 8, the dynamic pressure is no longer present; the actuating cylinder 66 must hold the gas load on the closed side and the static-loaded pressure in the buffer accumulator. In case of a full reversal, the gas loads on the vanes 57 and actuating force both tend to accelerate the system. After 30° of valve motion, the buffer force and gas loads decelerate the vanes 57 although the pneumatic actuating cylinder 66 still tends to accelerate them. Thus it is seen that the total capacity of each buffer 105 and 106 must be the same as the energy output of the actuating cylinder 66 throughout its stroke. The buffing is done by two components 92 and 93 in order that a solid connecting need not be used, and because this allows them to center the valve and hold it there.

There are two tensioning cylinders 94 and 95 for the same reason (no solid connection needed) and each one acts against the end of its respective push rod 109 and 110. When it is necessary to tension the cable 16 with the turbine just prior to a launching, the operator has only to open a valve controlled by lever S in Fig. 14 in order that one of the piston rods 109 and 110 move forward from its normally retracted position and engage the flat end of one of the long push rods or actuating levers 87 or 63. This forces the vanes 56 or 57 to move from neutral where they were being held by the centering forces of the buffers 92 and 93, and it allows more of the flow to go into one side of the duct than the other. The tensioning cylinders 94 and 95 are conventional hydraulic or pneumatic cylinders actuated by fluid pressure from a reservoir. The reservoir and fluid lines are not shown. This positioning of the vanes may also be used as a manual control for shuttle positioning by control of fluid through the vanes to the turbine. The location of the five cylinders, namely the two buffer, one actuating and two tensioning cylinders, on both top and bottom of each flow control gate is dependent upon clearances and load distribution. The greatest force is exerted by the buffers, next is the actuating cylinder, and the least load on the system is imposed by the tensioning or manual control cylinders. The first three have been placed between the gate sections so that the push rod or lever 63 and cranks 64 on one side will not have to transmit force to the other side, but it is possible to place a tensioning cylinder on each side because of the small force involved. The actuating cylinder 66 is the only one that need be swivel-mounted, for it is the only one that is connected to the linkage. For example, cylinder 66 is mounted on a bifurcated bracket 111 on a pivot pin 112 and is connected by piston rod 113 to the vane control linkage 63 and 64 by means of a ball and socket connection 113a with arm 107, see Figure 10a.

FLOW CONTROL GATE

The actuating cylinder 66 is air operated with a pilot operated control valve 115 connected by lines 121b and 121d to each side of the cylinder. Air is used here to achieve rapid operation of the order of 50 milliseconds with reasonably sized lines. This air may or may not be taken directly from a jet engine compressor bleed. The actuating link applies essentially constant torque to the vanes 56 and 57 throughout the 60° turning operation when reversing the turbine flow. The gas forces help to accelerate the vanes 56 and 57 during the first half of the flow reversing cycle and also help to arrest the vanes during the second half of the cycle.

Thus, for this critical flow reversal operation which must occur very rapidly (to keep free run to a minimum), the only requirement at this stage is to absorb the energy during the second half of the stroke that was put into the rotating vanes and attached linkage by the actuating cylinder 66 throughout the entire stroke. This is accomplished by one of the half-stroke buffers 92 or 93, which exert a constant decelerating force equal to twice the force exerted by the actuating cylinder 66.

The other functions of the flow control gate are necessary for turbine operation but are not as critical in time of operation. These functions are automatic equi-partition of flow, or control gate centering, manual selection of flow, and aircraft bridle tensioning prior to launching. Control gate centering is accomplished by the two opposed half-stroke buffers 92 and 93, respectively. If the gate valve vanes are offset to one side of center, one buffer is disengaged and the other one is compressed and tends to return the vanes 56 and 57 of the valve to the center position. In addition to this positive control, the gas loads on the vanes are unbalanced when the vanes are deflected off center such that the vanes are statically stable about the center position. Hence all that is required for centering is that the valve 115 controlling the actuating cylinder 66 be opened and the buffers 92 and 93 and the gas loads together will return the flow control gate vanes to center, see Figure 17.

Bridle tensioning prior to launching is accomplished by one of two other comparatively slow hydraulic acting cylinders 94 and 95 with piston rods 109 and 110, which merely push from one end of the bell crank linkage 64 to turn the control vanes 56 or 57 off center against gas loads and static buffer loads. When the hydraulic valve 115 is in the neutral position one of these cylinders 94 and 95 (see Fig. 10a) is moved to the tension position, by fluid pressure means controlled by the lever S in the control panel (Fig. 14), whereby the selected piston rod of one of the cylinders extends to its preset limit pushing the bell crank system off center from one side or the other thereof 63—64 to give the desired torque through the turbine for bridle tensioning prior to launching. The torque through the turbine results from slightly offset condition of one set of vanes allowing more gas to flow to one side than to the other. Thus, a slower speed suitable for cable tensioning prior to launching is effected. Hence, the name "tensioning cylinders" for the hydraulic cylinders 94 and 95. The respective piston rods 109 and 110 of each tension cylinder are not positively connected to the bell crank system; therefore, when the launching operation starts the tensioning cylinder piston rods retract and are completely out of the way when the flow control gate reverses the flow to arrest the turbine moving system.

CONTROL SYSTEM

The position of the flow gates, and consequently the direction of thrust of the catapult, is controlled pneumatically by the valve 115, see Fig. 13. This valve is connected to the main turbine shaft 18 through a slipping friction clutch 116 in such a manner that the motion of the shaft always tends to drive the flow gate to a position which will supply thrust opposite to the direction of movement of the catapult. The friction clutch 116 (see Fig. 16) is provided with a sector gear 116a which drivably engages with a sector gear 115a. The sector gear 115a forms the latch engaging arm of the valve 115 and has a dependent web 115b on the underside thereof which acts as the latch engaging means per se. Latches controlled by cam 117, which is geared directly to the turbine shaft, by the flyball speed governor 118, and by the manual controls 119 and 112 restrain the motion of valve 115 in such manner as to give the proper shuttle launching and retrieving cycle, see Figures 13 and 16.

In order to start and stop the catapult, a valve 121 is provided. This valve is located in the air line 121a between an air accumulator (not shown) at the end of the system pressure line PL and the main control valve 115. Valve 121 is controlled by a flyball governor 118 coupled directly to the turbine shaft 18. When the catapult speed is below a preset minimum (i.e., 20 knots), valve 121 is a well known poppet valve and closes off the system pressure line PL and vents the valve 115 pressure line 121a to atmosphere at 121g, thus allowing the flow gates to neutralize regardless of the position of the main control valve 115. When the operator's manual control 119 is in the "Start" position, piston 123 extends and lifts the governor up above the minimum speed position, thus closing valve 121 and applying pressure to the control system (see Fig. 16). This permits lever 121e to rock and move the piston rod 121f to close valve 121.

Four spring pressed latches 124, 125, 126 and 127 control the position of valve 115. Latch 124 holds the valve vanes in north power, 125 and 126 hold the valve vanes in neutral and 127 holds them in south power, see Figures 8, 9 and 10.

One of the latches 126 is shown in its operable relationship with the cam 117 and the sector gear 115a on the valve 115 in Fig. 16. The latch consists of a spring biased depressable body portion 126a having a step or slot 126b in one side thereof which cooperates with the camming surface 117a of the cam 117 to lower the latch at the proper time and allow the slip clutch to drive the main valve arm or sector gear 115a through means of the sector gear 116a and thereby move the valve 115 to another operative position. A hydraulic actuator or solenoid or other suitable device such as indicated at 131 and 132 in Fig. 13 is indicated by the numeral 126c in Fig. 16 to show the actual physical connection of this particular actuator with one of the latches 124, 125, 126 or 127. Each of these latches is similar to the latch 126, described above, and cooperates with the cam 117 and the camming surface 117a to effect the latching operation on the main valve arm 115a through the dependent web 115b thereon. Thus, the function of the latches is to prevent the slip clutch drive from actuating the valve 115 until such time as controlled by the cam 117.

Valves 115 and 121 will consist of as many separate valve fluid supply ducts as there are jet engines, in this instance there are four engines. These valves will be mechanically grouped together and operatively connected for unified control. Each engine control will have its own engine driven air compressor and accumulator, not shown, which lead through fluid pressure supply lines 121a to the actuating cylinder 66 or A.C. and to piston AP of each flow gate, see Figure 13. Any line failure will result in malfunction of only one flow gate as each engine and control line are separate.

The control actuation from the control panel, Fig. 14, will if possible be a direct mechanical or self-powered hydraulic master-slave type. If distance precludes this type, electric controls will have to be used.

SHUTTLE CONSTRUCTION

The shuttle S comprises for example an elongated aluminum alloy forging shaped like an I-beam with fore and aft wheel assemblies, that is wheels $W^1$ and $W^2$ at each end mounted on axles $X^1$ journalled in double bearings, not shown, housed in the shuttle body. These wheels roll along the underside of track 20 and the shuttle S includes fore and aft bumper projections $102^a$ and $103^a$ to engage the buffer pistons 21, bifurcated cable attachment lugs $104^a$ and $105^a$ and top saddle plates $106^a$ for attachment of hook towing attachments $107^a$ (see Figs. 11 and 12).

The bridle hook fittings $107^a$ are spring locked in slots under resiliently yieldable flange members $108^a$ on the top saddle plate $106^a$, which extends from the forging above the track. The bridle hook fittings $107^a$ are preferably of steel and the slots in the saddle plate $106^a$ are angularly varied so that the shuttle fittings may be mounted in at least three alternative positions to accommodate varying bridle directions with different types of airplanes, so that the direction of pull is substantially through the center of the shuttle, see Figure 11.

The shuttle S is so shaped and proportioned with respect to the track structure as to be enclosed with the extruded aluminum track ends $T^1$ and $T^2$ of track 20 and the only projecting parts of the shuttle are the top saddle plates $106^a$ and the bridle hook assemblies.

Control panel

The control panel is shown in Fig. 14. The main control handle 119 has two positions "Start" and "Stop." When the main control is in "Start," the catapult will continue to run back and forth. When the handle is moved to "Stop," the catapult will stop at the end toward which it is moving when the handle was moved to "Stop." An emergency control R is also provided. Actuating this control will stop the catapult immediately, and it will remain stopped until a resetting procedure is instituted. A dial instrument U showing catapult speed and shuttle position is included on the panel.

Example of a launching

Figure 15:
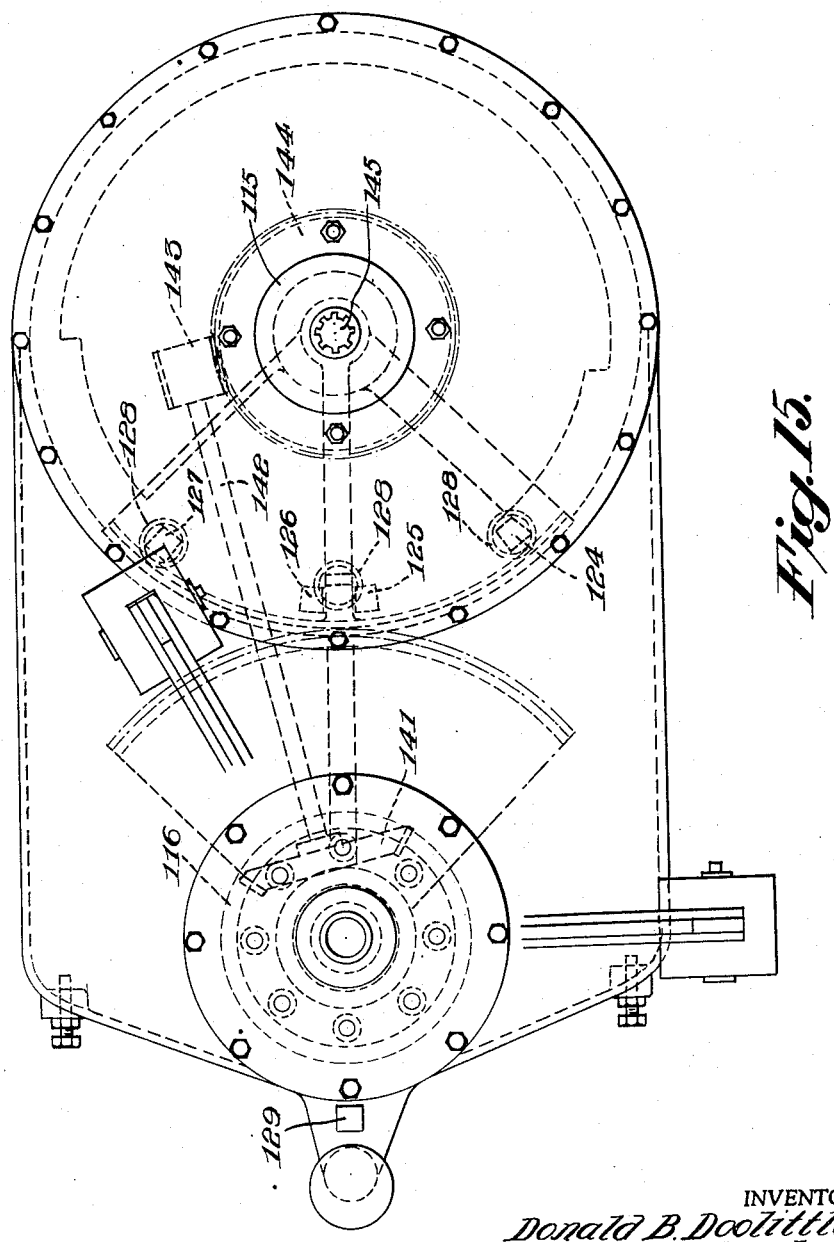
Figure 15 is a top plan view of the control unit shown diagrammatically in Figure 13.

To begin a north launching, the shuttle is at the south end of the track. The main valve 115 is in the north power position and is restrained from moving to the south position by latch 124 which is held in the extended position by spring 128, see Figs. 15 and 17. Latches 125 and 126 are held in the retracted position by cam 117. Latch 127 is retracted by cam 117. To begin the launching, the operator moves the control handle 119 to the "Start" position. This action lifts the governor 118 by piston 123 and allows valve 121 to pressurize the system. Since valve 115 is in north power position, the catapult begins to accelerate in a northerly direction. After a position approximately 250 feet from the south end of the track is reached (see Figs. 1 and 15), latch 127 is released by cam 117. Latch 127 is spring loaded by a spring 128 (Fig. 15) to move "up" and be ready to engage the dependent web 115b on the main control valve actuating arm 115a. The latches 125 and 126 are held down by means of cylinder 126c actuated by means of a piston 126e shown in Fig. 13 at the opposite end of the closed fluid line 126d as long as the control handle 119 is in the "start" position. The governor 118, as the speed increases, moves upward against its spring $118^a$ carrying cam rod 129 with it. When the preset catapult speed has been reached, cam rod 129 has moved far enough to actuate valve 130, (Fig. 15) which operates pistons 131 and 132 in closed fluid lines 131a and 132b. This action retracts latches 124 and 127 allowing friction clutch 116 to drive valve 115 to the south power position. When the catapult speed drops below the preset end speed, valve 130 closes and allows latches 124 and 127 to extend, thus locking lever of valve 115 in the south power position. As the acceleration reverses, the bridle drops from the airplane and launching is complete.

South power on the catapult engine stops the catapult. Since the control has been left in the "Start" position, the governor 118 is unable to operate valve 121; therefore, the engine remains in the south power position and accelerates the catapult in a southerly direction. After the catapult begins to move at least 20 knots south, the operator moves the control handle 119 to the "Stop" position. This allows latches 125 and 126 to extend after the catapult reaches a point approximately 250 feet from the north end, prior to reaching this point, 125 and 126 are held retracted by cam 117. When the catapult attains the preset velocity in a southward direction, the governor again retracts latches 124 and 127, allowing the valve 115 to be driven toward a north power position by friction clutch 116 through bevel gears 140 and 141 to a worm shaft 142 with gears 143 and 144 on shaft 145. The valve actuator rides over latch 126, which is ratcheting in this direction, and is arrested by latch 125 which holds valve 115 in neutral. In neutral, valve 115 vents to atmosphere both sides of the flow gate actuating cylinders 88 thus neutralizing the flow gates and allowing the catapult to coast at the preset speed. When a point 250 feet from the south end is reached, cam 117 retracts latches 125 and 127, allowing valve 115 to move to the north power position, thus reversing the catapult. Latch 124 locks valve 115 in the north direction.

When the catapult decelerates to a speed of approximately 15–20 knots, the governor 118 opens valve 121, thus venting the system and allowing the catapult to coast into the buffer 21 at the south end, where it is brought to rest by a hydraulic shock strut, see Figure 3. The catapult is now ready to make another north launching.

A south launching is made in exactly the same manner except that the shuttle is started from the north end of the track, with valve 115 in the south power position.

Tensioning control

To provide bridle tension during set-up and to allow movement of the shuttle at slow speeds, the hydraulic tensioning cylinders 94 and 95 are provided on the flow control gates. These when actuated will move the flow gate sufficiently off-center to drive the catapult at 15–20 knots in either direction. A tensioning handle on the panel actuates this control. The maximum speed possible under tensioning control will be limited to 15–20 knots by the natural tendency of the reversed turbine to give more torque. An auxiliary speed governor 118b may be provided for this function if necessary.

Safety features

The action of cam 117 on latches 124, 125, 126 and 127 assures against the catapult being run against the track buffers 21 at either end at too high speed. Cam 117, whenever the shuttle is within 250 feet of either end of the track, retracts the proper latches to insure that friction clutch 116 will drive valve 115 to a position which will give thrust resisting movement toward the near end. Only reduction in speed below 15-20 knots, safe speed for hitting the buffer, will allow this thrust to be relieved. No miscontrol on the part of the operator can run the shuttle into the end buffer 21 at excessive speed.

As protection against overspeed, auxiliary governor 118b is provided. If, through any accident, the speed reaches a value slightly over the maximum allowable, 150 knots for example, this governor actuates the emergency stop control 135.

In order to prevent reduction of throttle setting, a lock, not shown, which will prevent reduction of engine power after power is applied to the turbine will be provided. This lock will be actuated by the application of air pressure to valve 115.

In order to prevent any possibility of valve 121 opening after launching is started, a latch, not shown, will be provided which drops into place when 30 knots is reached.

Resetting

If the catapult has been stopped by use of the emergency control, it can be reset either by:

(a) Returning the emergency control to normal and using tensioning control to return the shuttle S to the starting point.

(b) Or by returning the emergency control to normal, tensioning in the direction opposite to that desired, allowing the shuttle to move about five feet, then pushing the handle to the "Start" position.

The first method can be used at any time while the second is possible only when the shuttle is more than 250 feet from the end of the track towards which you wish to move.

Additional features of control are as follows:

(1) If it seems advisable to return the catapult at a slower speed than the launching, the operator needs only to decrease the governor setting after acceleration is completed. The return stroke will be limited then by this new governor setting.

(2) If, for any reason, the speed does not reach the governed value by the time the shuttle is 250 feet from the far end, the catapult will be automatically reversed by the cam.

(3) If it is desired to change launching direction, the operator need only move the control to stop after the shuttle has reached 20 knots. The catapult will then launch to preset speed, coast to a point 250 feet from the far end, reverse, slow to 15-20 knots and stop against the bumper at the far end ready for making a launching in the opposite direction.

(4) The procedure outlined in (3) may be used, even if no plane or other load is attached.

(5) Using the procedure in (3), it is possible to launch continuously in reciprocal directions if desired.

Other forms of flow control gates from the respective jet engine exhausts may be mounted in the respective engine exhaust duct openings 140. For example, another form of control gate 141 is illustrated in Figures 18 and 19. This form of control gate comprises a rotatable body 142 angularly positioned between an upper turbine 143 and a lower turbine 144, said turbines being connected by ramp means 146 extending angularly between the turbines. Each end of each ramp is formed with a bearing opening or control gate disk support 148 in each of which is journalled one of the control gate disks 149 and 150 formed on opposite ends of the body 142. For example, the disk 149 of a control gate 141a is mounted in the lower bearing opening of the ramp 146 and the disk 150 of the next adjacent control gate 141b is mounted in the upper bearing opening 148 of the same ramp 146 and so on around the circumference of the upper and lower ramp connected turbines, see Figure 19. There may be six radially arranged jet engines if desired and six input exhaust ducts connected to each respective associated control gate arranged radially every sixty degrees from the center axis of turbine rotation and a very smooth and high energy output is developed thereby.

The flow control gate end bearing disks 149 and 150 surmount each end of the gate body 142, which body comprises two gate members 151 and 152, see Figure 19, positioned at substantially right angles to each other. These gate members are rotatable to thereby alternately close or open the upper or lower ducting 155 and 156 to the respective upper or lower turbines 143 and 144. Also arranged in the path of flow from the jet engine exhaust ducts are directing vanes 154. The vanes are mounted in a rectangular framework 157, which bisects the right angle apex of the gate members 151 and 152.

Thus as illustrated in Figure 19, the control gate is rotated to either open duct 155 to the upper turbine 143 or to a position whereby the gate member 151 closes the duct 155 and opens the duct 156 to the lower turbine 144. The rectangular opening 158 connects to the jet engine exhaust or tail pipe. Also fixed ducting baffles 159 are positioned in front of the respective upper and lower turbines.

The flow gate actuator mechanism is similar to the mechanism of form one hereinbefore described and is shown applied to the rotatable gate body in Figure 18, and comprising upper and lower actuator arms 160 and 161. These arms are connected and controlled by upper and lower cable means 162 and 163, the upper cable being reeved around sheaves 164, 165, 166, 167 and 168, and the lower cable around sheaves 170, 171, 172, 173 and 174.

The opposite ends of each cable means 162 and 163 are coupled to opposed yokes 175 and 176 mounted between the respective piston rods 177—178 and 179—180 of the actuator cylinder 181 and the respectively aligned centering cylinder 182 and 183 secured to the control cylinder support member 184. Mounted on the support member 184 of each side of each centering cylinder are pairs of tensioning cylinders 185 and 186 and 187 and 188 and on each side of the cylinder 181 are buffer cylinders 190 and 191. These respective cylinders operate in a manner similar to their respective counterparts as described in connection with the control gate of form one of the present invention in response to the speed responsive control governor geared directly to the turbine shaft.

Although the present invention is only described and illustrated in detail for several arrangements thereof, it is to be expressly understood that the same is not limited thereto, and that various changes may be made in the designs and arrangements illustrated, as will now be apparent to those skilled in the art. For a definition of the limits of the invention, reference should be had to the appended claims.

What is claimed is:

1. A gas flow regulator valve, gas directing ducting having branch ducts each having an inlet and an outlet, said regulator valve comprising a housing having an inlet connection, and two angularly spaced apart outlet connections, each of said outlets being connected to one of said inlets of said gas directing ducting, a plurality of vanes extending across said angularly spaced apart outlets, and speed responsive means adapted to move some of said vanes, to thereby regulate the flow output from said outlets and the associated branch ducts.

2. The gas flow regulator valve described in claim 1, wherein some of said vanes are pivotally mounted on axle means journalled in the upper and lower walls of said valve housing, and actuating means connected to said axle means for turning said vanes to open position, to thereby provide spaced openings therebetween or to turn said vanes to closed position into longitudinal edge to edge abutting engagement.

3. The gas flow regulator valve described in claim 1, wherein the longitudinal edges of said vanes are formed with interfitting edges when in closed position, one longitudinal edge of each vane being rounded and the opposite longitudinal edge of each vane being concave to receive the rounded edge of a next adjacent vane.

4. Valve means for controlling the direction of rotation of a turbine in response to a predetermined speed of operation thereof, linkage means for operating said valve means, manually settable operating means connected to said valve means adapted to move said valve means in a forward or reverse position with respect to a center neutral position, and responsive control means connected to said linkage means adapted to override said manually setting operating means at predetermined turbine speed, said valve means including a plurality of angularly movable vanes connected to said linkage means.

5. The valve means described in claim 4, wherein said valve means comprises a triangular-shaped housing, said housing having top and bottom walls and three side walls, one of said side walls being formed with an inlet opening, an exhaust duct encircling the inlet opening, each of said other side walls being formed with a power outlet opening, duct means, elongated vane means pivotally mounted between said top and bottom housing walls in spaced apart relation in each respective outlet opening so as to close or open the same, elongated stop means fixedly mounted between said top and bottom housing walls downstream from said respective outlet openings and said vane means adapted to stop and align with said pivotally mounted vane means as a continuation thereof when said vane means are fully pivoted to open an associated outlet opening by said manually settable operating means.

6. A combustion gas flow gate actuating system, comprising a flow gate, an actuator cylinder for moving said gate, main valve means adapted to control the direction of movement of said actuator cylinder and said operatively connected flow gate, a second valve means, speed responsive means adapted to regulate the opening and closing of said second valve means to control the first valve means and said actuator cylinder, and manual control means adapted to close said second valve means independently of said speed responsive means to start operation of said flow gate from said main valve means.

7. A flow directing gate for combustion gases comprising, in combination, an inlet, a plurality of outlets, a plurality of movably mounted flow directing means across said outlets, actuating means for moving said flow directing means such that the flow is directed through said outlets in a predetermined manner, said flow directing means being so mounted that they will be subjected at times to the force of flow of the combustion gases tending to overpower said actuating means, and motion damping means for said flow directing means to prevent said combustion gases from overpowering said actuating means, whereby said movably mounted flow directing means are under complete control of said actuating means.

8. A flow directing gate for combustion gases comprising, in combination, a housing having a single inlet and a pair of outlets, flow control means within said housing comprising first and second banks of flow control vanes, each of said banks being mounted across a respective one of said outlets and converging one toward the other in the general direction of flow, a pair of control linkages connected one to each bank for providing simultaneous control of the vanes therein, and actuating means connected to said control linkages for selectively positioning said vanes in said banks to direct the flow of combustion gases through said outlets in a predetermined manner.

9. A flow directing gate for combustion gases comprising, in combination, a housing having a single inlet and a pair of outlets, flow control means within said housing comprising first and second banks of adjustable flow control vanes, each of said banks being mounted across a respective one of said outlets and converging one toward the other in the general direction of flow, a pair of control linkages connected one to each bank for providing simultaneous control of the vanes therein, actuating means connected to said control linkages for selectively positioning said vanes in said banks, said flow control means being so mounted that they will be subjected at times to the force of flow of combustion gases tending to overpower said actuating means, and damping means between said actuating means and said control linkages for preventing over-acceleration of the vanes by the combined action of the actuating means and the combustion gases, whereby the flow of combustion gases may be selectively directed through said outlets in a smooth and positive manner.

10. In combination, a turbine having dual reaction elements adapted one to each direction of rotation and a flow gate for controlling the flow of combustion gases to said reaction elements, said flow gate comprising a housing having a single inlet and a pair of outlets, and first and second banks of adjustable flow control vanes mounted one across each of said outlets whereby when said first bank of vanes is in an open position said turbine will be driven in one direction of rotation, when said second bank of vanes is in an open position said turbine will be driven in the opposite direction of rotation and when both said first and second banks of vanes are opened an equal amount said turbine will remain stationary.

11. A flow directing gate for combustion gases comprising, in combination, a housing having a single inlet and a pair of outlets, flow control means within said housing comprising first and second banks of flow control vanes, each of said banks being mounted across a respective one of said outlets and converging one toward the other in the general direction of flow, a pair of control linkages connected one to each bank for providing simultaneous control of the vanes therein, and auxiliary actuating means connected one to each of said control linkages at the end opposite to said actuating means whereby said banks of vanes may be individually adjusted to permit an excess flow of combustion gases through one of said outlets over the other of said outlets.

12. A flow directing gate for combustion gases comprising, in combination, a housing having a single inlet and a pair of outlets, flow control means within said housing comprising first and second banks of adjustable flow control vanes, each of said banks being mounted across a respective one of said outlets and converging one toward the other in the general direction of flow, a pair of control linkages connected one to each bank for providing simultaneous control of the vanes therein, actuating means connected to said control linkages for selectively positioning said vanes in said banks and auxiliary actuating means connected one to each of said control linkages at the end opposite to said actuating means whereby said banks of vanes may be individually adjusted to permit an excess flow of combustion gases through one of said outlets over the other of said outlets.

13. In a control system for a dual turbine having forward and reverse directions of rotation, in combination, a plurality of flow gates for directing the flow of combustion gases to a predetermined side of said turbine, a source of operating pressure, a plurality of pressure operated actuating cylinders mounted one on each of said flow gates, first valve means connected to said source of operating pressure and to each of said actuating cylinders to control the direction of actuation thereof, turbine revolution responsive control means for said first valve means, power takeoff means between said turbine and said first valve means for actuating said first valve means and controlled by said revolution responsive control means, turbine speed responsive control means for said first valve means and said power takeoff means in active cooperation with said revolution responsive control means, and second valve means between said pressure source and said first valve means controlled by said speed responsive means to disconnect said first valve means from said pressure source at a predetermined turbine speed and thereby deactivate said actuating cylinders whereby said flow control gates will be allowed to assume a neutral position to prevent said combustion gases from imparting rotation to said turbine.

14. In a control system for a dual turbine having forward and reverse directions of rotation, in combination, a plurality of flow gates for directing the flow of combustion gases to a predetermined side of said turbine, a source of operating pressure, a plurality of pressure operated actuating cylinders mounted one on each of said flow gates, valve means connected to said source of pressure and to each of said actuating cylinders to control the direction of actuation thereof, and control means responsive to the speed and degree of rotation of said turbine for positioning said valve means, whereby said actuating cylinders are energized to actuate said flow gates and said combustion gases are directed into said turbine in a predetermined manner.

15. In a control system for a dual turbine having forward and reverse directions of rotation, in combination, pressure operated means for controlling the direction of rotation of said turbine, a source of operating pressure, turbine speed responsive means, valve means controlled by said speed responsive means to control the supply of operating pressure to said pressure operated means and control means actuated by said turbine speed responsive means at a predetermined turbine speed to cooperate with said valve means and said pressure operated means to reverse the direction of rotation of said turbine.

16. In a control system for a combustion gas driven dual turbine having forward and reverse directions of rotation, in combination, pressure operated means for controlling the direction of rotation of said turbine, a source of operating pressure, and a valve means for controlling the supply of operating pressure to said pressure operated means, said pressure operated means comprising a flow directing gate for said combustion gas having an inlet for the reception of combustion gases from a suitable source of supply, a plurality of outlets for delivering said gases to said turbine, a plurality of movably mounted flow directing means across said outlets and actuating means for moving said flow directing means such that the flow is directed through said outlets in a predetermined manner to control the direction of rotation of said turbine.

17. In a control system for a combustion gas driven dual turbine having forward and reverse directions of rotation, in combination, flow gates for controlling the flow of said combustion gases to said turbine to control the direction of rotation thereof, pressure operated actuating means for said flow gates, and valve means for controlling said actuating means, said valve means comprising a three-way valve having forward, reverse and neutral positions to correspond to respective conditions of rotation of said turbine, said neutral position corresponding to a condition wherein said turbine may coast in one direction of rotation or remain stationary, actuating means drivably connected with said turbine for moving said three-way valve from one position to another, latch means for holding said three-way valve in each of its respective positions, and condition responsive control means for said latch means responsive to predetermined running conditions of said turbine.

18. In a control system for a combustion gas driven dual turbine having forward and reverse directions of rotation, in combination, pressure operated means for directing the flow of combustion gases to said turbine to control the direction of rotation thereof, and valve means for controlling said pressure operated means in response to a predetermined condition of said turbine, said valve means comprising, a three-way valve having forward, reverse and neutral positions to correspond to respective conditions of rotation of said turbine, said neutral position corresponding to a condition wherein said turbine may coast in one direction of rotation or remain stationary, actuating means drivably connected with said turbine for moving said three-way valve from one position to another, latch means for holding said three-way valve in each of its respective positions, and condition responsive control means for said latch means responsive to predetermined running conditions of said turbine.

19. In a control system for a combustion gas driven dual turbine having forward and reverse direction of rotation, in combination, pressure operated means for directing the flow of combustion gases to said turbine to control the direction of rotation thereof, three-way valve means having forward, reverse and neutral positions for controlling said pressure operated means, said positions to correspond to respective conditions of rotation of said turbine, said neutral position corresponding to a condition wherein said turbine may coast in one direction or remain stationary, and means responsive to predetermined turbine conditions for controlling said valve means, said means comprising, power takeoff means on said turbine, a valve actuating arm in driven relationship with said power take off means, latches mounted adjacent said actuating arm and engageable therewith in each of said positions of said valve, revolution responsive means for actuating said latches in response to a predetermined number of turbine revolutions, and speed responsive means for actuating said latches at a predetermined turbine speed, whereby complete control of said turbine with respect to direction and speed of rotation is provided.

20. The combination as defined in claim 19 wherein said revolution responsive control means comprises an output shaft driven by said turbine, a worm gear on said shaft, a pinion gear driven by said worm gear and cam means integral with said pinion and rotating therewith at a revolution rate less than but in direct proportion to the number of revolutions of said turbine, said cam means having a plurality of cam surfaces thereon which cooperate with said latch means to permit said latches to engage or disengage said valve actuating arm after a predetermined number of revolutions of said turbine.

21. The combination as defined in claim 19 wherein said speed responsive control means comprises a flyball governor, a linear cam attached to said governor for vertical movement therewith in response to variations in turbine speed and having a land thereon corresponding to a predetermined maximum speed of said turbine and hydraulic means adjacent said cam means and connected to said latch means whereby when said predetermined maximum speed is reached, said land will actuate said hydraulic means to disengage said latch means from said valve actuating arm and permit said power takeoff means to drive said valve means to another position, thereby preventing said turbine from attaining a greater speed of rotation.

22. In a control system for a combustion gas driven dual turbine having forward and reverse directions of rotation, in combination, pressure operated means for directing the flow of combustion gases to said turbine to control the direction of rotation thereof, three-way valve having forward, reverse and neutral positions for controlling said pressure operated means, said positions to correspond to respective conditions of rotation of said turbine, said neutral position corresponding to a condition wherein said turbine may coast in one direction or remain stationary, and means responsive to predetermined turbine conditions for controlling said valve means, said means comprising, power takeoff means on said turbine, a valve actuating arm in driven relationship with said power takeoff means, latches mounted adjacent said actuating arm and engageable therewith in each of said positions of said valve, revolution responsive means for actuating said latches in response to a predetermined number of turbine revolutions, speed responsive means for actuating said latches at a predetermined turbine speed and manual control means for overriding said speed and revolution responsive means to provide additional selective control over said turbine.

References Cited in the file of this patent

UNITED STATES PATENTS

| | | |
|---|---|---|
| 514,918 | Egedal | Feb. 20, 1894 |
| 755,062 | Shepherd | Mar. 22, 1904 |
| 762,016 | Wyand | June 7, 1904 |
| 967,444 | Sahlin | Aug. 16, 1910 |
| 1,535,190 | Van Metre | Apr. 28, 1925 |
| 1,874,932 | Dow | Aug. 30, 1932 |
| 1,935,062 | Schmidt | Nov. 14, 1933 |
| 2,236,865 | Bailey | Apr. 1, 1941 |
| 2,303,295 | Allen | Nov. 24, 1942 |
| 2,624,364 | Detlefsen | Jan. 6, 1953 |
| 2,718,751 | Huber | Sept. 27, 1955 |
| 2,759,327 | Huber | Aug. 21, 1956 |
| 2,760,336 | Reniger | Aug. 28, 1956 |
| 2,770,943 | Beale | Nov. 20, 1956 |

FOREIGN PATENTS

| | | |
|---|---|---|
| 541,307 | Great Britain | Nov. 21, 1941 |